(12) United States Patent
Mourou et al.

(10) Patent No.: US 12,686,343 B2
(45) Date of Patent: ***Jul. 21, 2026

(54) LAMINATED VEHICLE GLASS STRUCTURES INCLUDING EMBEDDED PIEZOELECTRIC EXCITERS FOR SOUND GENERATION

(71) Applicant: GM Global Technology Operations LLC, Detroit, MI (US)

(72) Inventors: Julien P. Mourou, Bloomfield Hills, MI (US); Bo Yang, Rochester Hills, MI (US); Gerard Parij, Warren, MI (US); Bradley Allen Newcomb, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 506 days.

This patent is subject to a terminal disclaimer.

(21) Appl. No.: 18/318,986

(22) Filed: May 17, 2023

(65) Prior Publication Data

US 2024/0383412 A1     Nov. 21, 2024

(51) Int. Cl.
B60R 11/02 (2006.01)
B32B 17/10 (2006.01)
B60R 11/00 (2006.01)

(52) U.S. Cl.
CPC .... B60R 11/0217 (2013.01); B32B 17/10036 (2013.01); B32B 17/10174 (2013.01); B32B 17/10779 (2013.01); B32B 17/10871 (2013.01); B32B 17/10935 (2013.01); B32B

*2307/20* (2013.01); *B32B 2307/416* (2013.01); *B32B 2457/00* (2013.01); *B32B 2605/00* (2013.01); *B60R 2011/0026* (2013.01); *B60R 2011/0043* (2013.01)

(58) Field of Classification Search
None
See application file for complete search history.

(56) References Cited

U.S. PATENT DOCUMENTS

2002/0094407 A1 * 7/2002 Frost ................. B32B 17/10036
428/77
2021/0352390 A1 * 11/2021 Lee ......................... H04R 9/066

FOREIGN PATENT DOCUMENTS

WO          WO-9210632 A1 *   6/1992    ............. C03C 17/36
WO       WO-2022009180 A1 *   1/2022    ....... B32B 17/10036

* cited by examiner

*Primary Examiner* — David Sample
(74) *Attorney, Agent, or Firm* — CANTOR COLBURN LLP

(57)          ABSTRACT

Laminated vehicle glass structures included embedded piezoelectric exciters for sound generation. The piezoelectric exciters are embedded at least partially within the laminating materials and are offset relative to a centerline longitudinally extending between the opposing glass panels. Also disclosed are processes for forming the laminated glass structures. The laminated glass structures can be utilized about the vehicle anywhere sound generation is desired, e.g., passenger windows, fixed or sliding roofing systems, front windshield, rear windshield, side windows, rear quarter glasses, and the like. The piezoelectric exciters act as a diaphragm to produce sound upon vibration.

20 Claims, 4 Drawing Sheets

LAMINATED VEHICLE GLASS STRUCTURES INCLUDING EMBEDDED PIEZOELECTRIC EXCITERS FOR SOUND GENERATION

INTRODUCTION

The subject disclosure relates to laminated vehicle glass structures, and more particularly, to laminated vehicle glass structures including embedded piezoelectric exciters for sound generation, wherein the piezoelectric exciters are at least partly embedded with a polymeric laminating material between glass panels off-axis to a centerline longitudinally extending between opposing glass panels.

Current speaker technology utilized in vehicles generally employ a moving coil and cone technology that are placed within doors, instrument panels, roofing, and elsewhere throughout the vehicle to produce sound. The speakers function as transducers to convert amplified electrical waves from an infotainment system, phone, or the like into sound pressure waves that propagate in the air for occupants to hear. An amplifier feeds a signal to two terminals on the back of a speaker. These terminals pass the current into a cylindrical coil of wire, which is suspended in the circular gap between the poles of a permanent magnet. This coil moves back and forth inside the magnetic field as the current passing through it alternates in direction with the signal applied, per Faraday's law. The center of the speaker cone is attached to one end, which gets driven back and forth by the moving coil. This cone is held at its edges by an airtight suspension or surround. As the cone moves, it pushes and pulls the surrounding air; by doing so it creates pressure waves in the air in the form of sound.

Coil and cone type speakers can add substantial weight to a vehicle, require individual installation and connection, occupy valuable interior trim space, allow significant road noise intrusion, and are subject to substantial shock and environmental abuse. Moreover, because of the limited trim space available for speaker placement, the speakers can be poorly positioned for listening. Their on-axis radiation is typically directed low in the vehicle toward occupants' legs and midsections rather than at the occupants' ears. The direct sound from the speaker to the listener is typically far off-axis and highly variable in frequency response with typically insufficient high frequencies. In the high noise environment of a vehicle, this typically results in mid and high frequency audio information getting lost. "Imaging", the perception of where sound is coming from, is also adversely affected since the loudspeakers are low in the vehicle; for the front passengers, the audio image is pulled down into the doors while the rear passengers have an image to the side or rear instead of what should be presented in front of them.

Accordingly, it is desirable to better position the speakers within the vehicle while minimizing trim space requirements, weight, road intrusion noise, abuse, and the like.

SUMMARY

In one exemplary embodiment, a laminated glass structure for a vehicle includes a first glass panel, a second glass panel, and a laminating material intermediate the first and second glass panels. One or more piezoelectric exciters are embedded within the laminating material and offset relative to a centerline longitudinally extending between the first and second glass panels. In addition to one or more of the features described herein, the centerline can be defined by a plastic layer. In one or more aspects, the plastic layer includes polyethylene terephthalate. The laminating material can have a thickness of about 0.3 millimeters to about 2 millimeters and include a polyvinyl butyral resin or an ethylene vinyl acetate. The first glass panel can include an outer surface facing an exterior of the vehicle and is at a thickness within a range of about 1.6 millimeters to about 3.5 millimeters and the second glass panel can include an outer surface facing an interior of the vehicle and is at a thickness within a range of about 0.7 millimeters to about 3.5 millimeters. The one or more piezoelectric exciters can include a ring structure having a thickness dimension less than a thickness dimension for the laminating material. In one or more other aspects, the one or more piezoelectric exciters include a lead zirconium titanate piezoelectric material. The one or more piezoelectric exciters can be bonded directly to an interior surface of a selected one of the first and second glass panels. In one or more aspects, there are at least two adjacent piezoelectric exciters contacting a selected surface of the plastic layer, wherein the at least two adjacent piezoelectric exciters contact the same selected surface. The one or more piezoelectric exciters can include a ring structure including a circular-shape, an oval-shape, or a polygonal shape.

In another exemplary embodiment, a process of forming a laminated glass structure for a vehicle includes adhesively applying at least one piezoelectric exciter to a selected glass surface of a first glass panel, to a selected glass surface of a second glass panel, or a combination thereof. The first glass panel, the second glass panel; and at least one sheet of laminating material are assembled to form an assembly, wherein the selected glass surface(s) including the one or more hard piezoelectric exciters is oriented to contact the laminating material. The process includes applying heat and pressure to the assembly in amounts effective to laminate the first glass panel to the second glass panel and form the laminated glass structure, wherein the one or more hard piezoelectric exciters are intermediate the first and second glass panels and are offset relative to a centerline longitudinally extending between the first glass panel and second glass panel. In one aspect, the laminating material includes polyvinyl butyral resin or ethylene vinyl acetate. In other aspects, the one or more hard piezoelectric exciters include a ring structure. The one or more hard piezoelectric exciters can include lead zirconium titanate. In one or more aspects, there are at least two sheets of the laminating material, and the assembly further includes a plastic layer configured for solar reflectivity and intermediate the at least two sheets of the laminating material and at the centerline. The plastic layer can include polyethylene terephthalate. In one or more aspects, the piezoelectric exciter includes a ring structure having a thickness dimension less than a thickness dimension for the at least one sheet of laminating material.

In yet another exemplary embodiment, a laminated glass structure for a vehicle includes an outer glass panel, an inner glass panel and a laminating material between the outer and inner glass panels. The outer glass panel has a thickness of about 1.6 to about 3.5 millimeters and includes an outer surface exposed to an environment about the vehicle and an inner surface. The inner glass panel has a thickness of about 0.7 millimeters to about 3.5 millimeters and includes an inner surface and an outer surface exposed an interior of the vehicle. The laminating material has a thickness of about 0.3 millimeters to about 2 millimeters between the outer glass panel and the inner glass panel and is in contact with the inner surfaces of the outer and inner glass panels. The laminating material includes polyvinyl butyral resin or ethylene vinyl acetate. One or more hard piezoelectric exciters are embedded at least partly in the laminating material. The hard piezoelectric exciters are in a shape of a ring having a thickness less than an actual thickness of the laminating material, wherein the one or more hard piezoelectric exciters are offset relative to a centerline extending between the inner surfaces of the outer and inner glass panels and are in contact with a selected one of the inner surfaces or completely embedded in the laminating material. The laminated glass structure forms a fixed or sliding glass roofing system, one or more passenger movable windows, a front windshield and/or a rear windshield.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
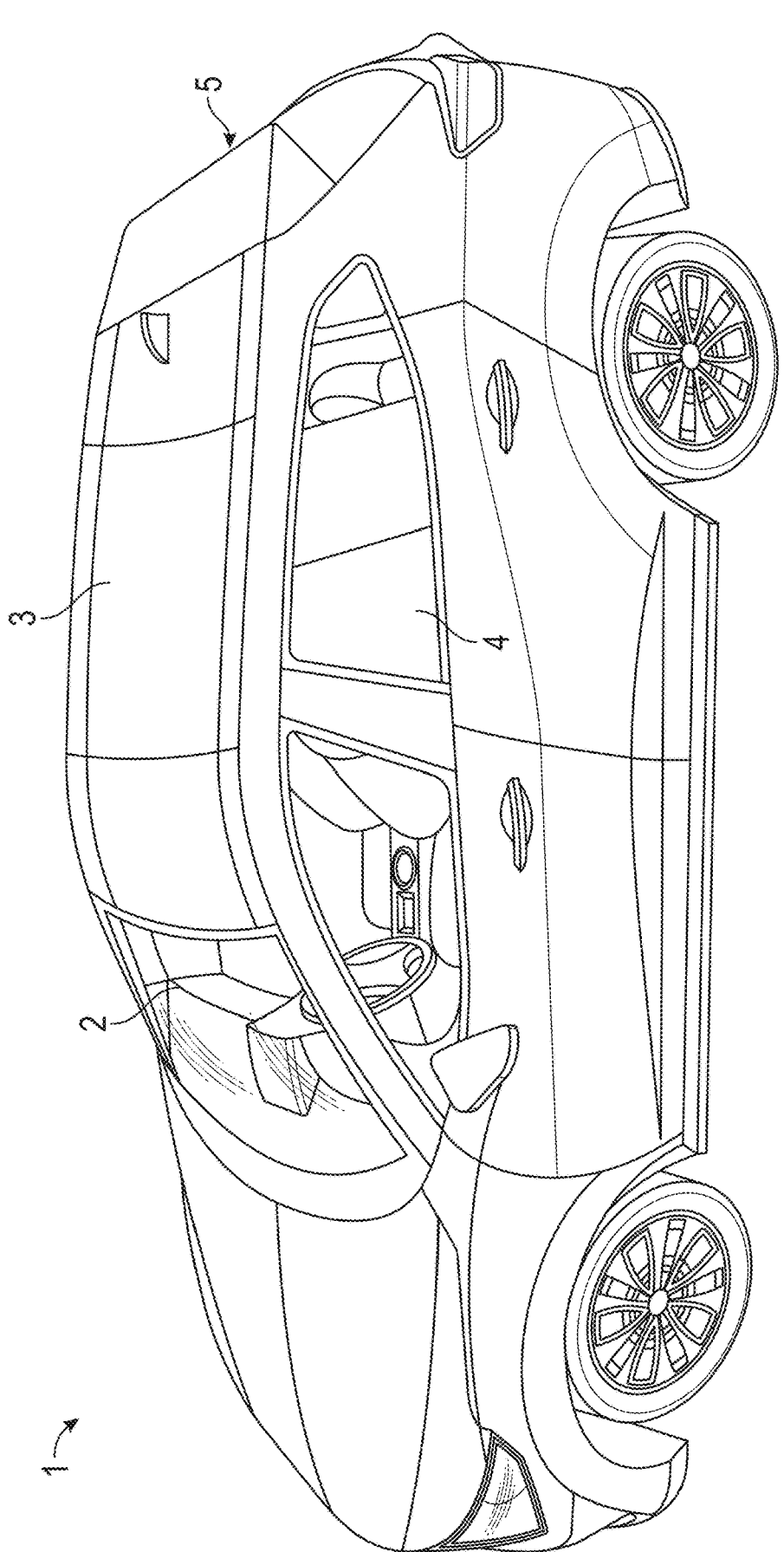
FIG. 1 illustrates a perspective view of an exemplary vehicle including numerous laminated glass panels.

The following description is merely exemplary in nature and is not intended to limit the present disclosure, its application or uses. It should be understood that throughout the drawings, corresponding reference numerals indicate like or corresponding parts and features.

In accordance with an exemplary embodiment, laminated glass assemblies for vehicles are provided including one or more piezoelectric exciters embedded within a polymeric laminating material utilized to laminate two glass panels together within the laminated glass assembly. Regulated power can be supplied to the piezoelectric actuators via the vehicle infotainment system. For example, the infotainment amplifier system can be electrically coupled to the piezoelectric exciters using patterned conductive coatings directly on the glass surface within the laminate structure and/or through the use of negative and positive wires electrically coupled to the piezoelectric exciter, which may or may not be insulated if sufficiently spaced apart from one another. In the case of a patterned conductive surface within the laminate structure, the conductive surface would be provided on inner surfaces of the glass panels or on a selected surface of a plastic layer, if present within the laminating material.

Although reference is made to two glass panels, it should be apparent that more than two glass panels could be utilized although the increases in weight would make this less practical. The laminated glass assemblies including the one or more embedded piezoelectric exciters can be used in in vehicles wherever laminated glass assemblies are utilized including, for example, fixed glass roofing systems, front windshields, side moving glasses, rear quarter glasses, rear glasses, and the like. Unlike coil and cone-based speakers, the piezoelectric exciters advantageously occupy minimal space, are of significantly lower weight, can be used to occupy space within the vehicle previously not used for speaker placement, (i.e., in the laminated glass structure), and can be located above and/or next to the occupant(s) as opposed to coil and cone speakers, which are often placed within trim panels below the vehicle windows, (e.g., door panels).

As used herein, when referring to the laminated glass structure including two glass panels, the terms "ambient glass-side" and "exterior glass-side" are interchangeable and generally refer to the glass panel including a surface that is exposed to the environment. In contrast, the terms "cabin glass-side" and "interior glass-side" are interchangeable and generally refer to the glass panel including a surface exposed to the interior of the vehicle. As is commonly referred to in the vehicle art with glass laminate structures including two pieces of glass, the exterior facing surface of the exterior glass-side panel is referred to as side 1 and the corresponding inner surface is referred to as side 2. The inner surface of the interior glass-side panel is referred to as side 3 and the corresponding interior-facing glass surface is referred to as side 4.

Conventional techniques related to windshield manufacturing processes may or may not be described in detail herein. Moreover, the various tasks and process steps described herein can be incorporated into a more comprehensive procedure or process having additional steps or functionality not described in detail herein. In particular, various steps in the windshield manufacturing processes are well known and so, in the interest of brevity, many conventional steps will only be mentioned briefly herein or will be omitted entirely without providing the well-known process details.

Spatially relative terms, e.g., "beneath," "below," "lower," "above," "upper," and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations) and the spatially relative descriptors used herein interpreted accordingly.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects. Additionally, the terms "upper", "lower", "top", "bottom", "left," and "right," and derivatives thereof shall relate to the described structures, as they are oriented in the drawing figures. The same numbers in the various figures can refer to the same structural component or part thereof.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

As shown in FIG. 1, a perspective view of an exemplary vehicle 1 is depicted and includes numerous glass panels including a front windshield 2, a fixed roofing systems 3, moving glass roof systems (not shown), side moving glasses 4, rear quarter glasses (not shown), and rear glasses 5. The arrangement, shape, and/or location will generally vary among different vehicles.

The glass panels for vehicles such as that described above are generally laminated structures including an exterior glass panel including sides 1, 2 and an interior glass panel including sides 3, 4 laminated together using a polymeric laminating material. The laminated glass structure is generally formed from glass panels having a shape intended for its use. For example, fixed roofing applications generally utilize rectangular shaped glass panels that are laminated together. Known glass panels can be made of heat-ray absorbing glass, regular clear glass, green glass, or UV green glass. In some embodiments, adjustments can be made so that the outer glass panel ensures a desired solar and/or tint absorptance and the inner glass panel provides visible light transmittance. Other materials can also be used as laminated transparent panels including but not limited to polycarbonate resins.

Although there is no limitation on the thickness of the laminated glass structure, for a roof application the total thickness of the outer glass panel is generally set within a range of about 1.6 to about 3.5 millimeters (mm) and the inner glass panel is generally set within a range of about 0.7 to about 3.5 mm. The thickness of the polymeric laminate layer can be from about 0.3 mm to about 2 mm, although greater or lesser thicknesses can be utilized. By way of example, the laminate can be about 0.80 mm.

The process of laminating the laminated glass structure generally includes application of heat and pressure to bond two or more layers of glass together with a layer of interlayer material such as polyvinyl butyral, ethylene vinyl acetate, or the like, in between. The interlayer material is usually melted or softened by the heat, allowing it to bond the glass layers together and create a strong, durable laminate. The temperature range for laminating glass is typically between 120° C. and 150° C. (248° F. and 302° F.), although some processes may use higher or lower temperatures depending on the materials and equipment being used. The pressure range for laminating glass can vary widely depending on the specific lamination process, but it is typically between 10 and 15 psi (0.7 and 1 bar). Some processes may use higher pressures to achieve a stronger bond, while others may use lower pressures to reduce the risk of damaging the glass. In some applications, a mask layer can be formed of a ceramic, metal or the like can be provided about the periphery of one or both glass panels prior to lamination.

In one or more embodiments, a laminated glass assembly for a vehicle includes a piezoelectric exciter provided within a polymeric laminating material used to laminate a first glass panel to a second glass panel. The piezoelectric exciters are configured to be offset from a centerline longitudinally extending between the exterior and interior glass panels within a thickness of the polymeric laminating material. For example, it has been found that if the piezoelectric exciters are the same thickness as the polymeric laminating material and contacts both glass panels, the vibrations of the ambient side glass (exterior) and the cabin side glass (interior) are at opposite phase and cancel each other out, thereby producing minimal and/or distorted sound. Likewise, minimal and/or distorted sound will be produced if the piezoelectric exciter is situated within the middle of the polymeric laminating material at the centerline without contact to either the ambient-side or the cabin side glass panel and at the same distance each respective glass panel. The vibrations of the piezoelectric exciter from each respective glass panel would be at opposite phases and cancel each other out so that minimal and/or distorted sound is emitted. However, if the piezoelectric exciter is configured offset relative to the centerline longitudinally extending between the exterior and interior glass panels and contacts or is in closer proximity to either the ambient side or the cabin side glass, the vibrations of the ambient- and cabin-side glass are of the same phase and provide sound.

The piezoelectric exciters are ring-shaped and are a type of exciter that uses piezoelectric materials to convert electrical energy into mechanical energy. The exciters consist of a ring-shaped piezoelectric material, typically made of lead zirconate titanate (PZT), that is sandwiched between two electrodes. When an electric voltage is applied to the electrodes, the piezoelectric material expands or contracts, causing the ring to deform and produce mechanical motion. In the present disclosure, the piezoelectric exciters have a thickness less than a thickness of the laminate material(s) intermediate the glass panels. In one or more embodiments of the present disclosure, the piezoelectric exciters are selected to have a thickness less than 0.6 millimeters (mm).

Piezoelectric exciters suitable for use in the present disclosure include, but are not limited to, a hard piezoceramic material for exciting and causing vibration of the glass panels. Exemplary hard piezoceramic material include piezoelectric shaped rings such as those that are circular, oval, polygonal, or any other geometric shape can be used and generally function as diaphragms in the laminated glass structure in a manner similar to coil-cone type speakers.

Hard piezoelectric exciters generally have a higher mechanical quality factor compared to soft piezoelectric exciters that are often configured as a film. Hard piezoelectric ceramics are suitable for dynamic/on-resonance applications and the higher mechanical quality factor provides more efficient energy conversion (from electrical to work), hard materials can withstand high level of electrical excitation and mechanical stress, generate less heat during this process and are not easy poled or depoled except at elevated temperature. Compared to soft piezoelectric materials, hard piezoelectric materials lack the strain because of the lower charge coefficients (d).

Figure 2A:
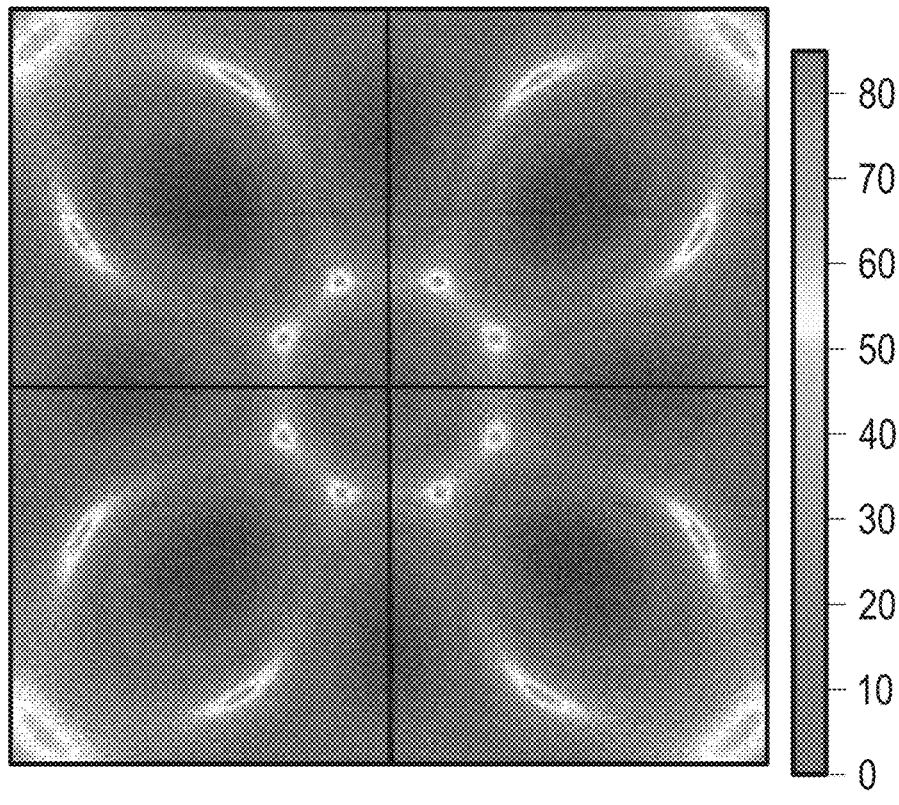
FIGS. 2A and 2B depict contour plots of total sound pressure level in decibels for a piezoelectric exciter embedded within a laminating material in a laminated glass structure in accordance with one or more embodiments of the present disclosure and a piezoelectric exciter by itself, respectively.
Figure 2B:
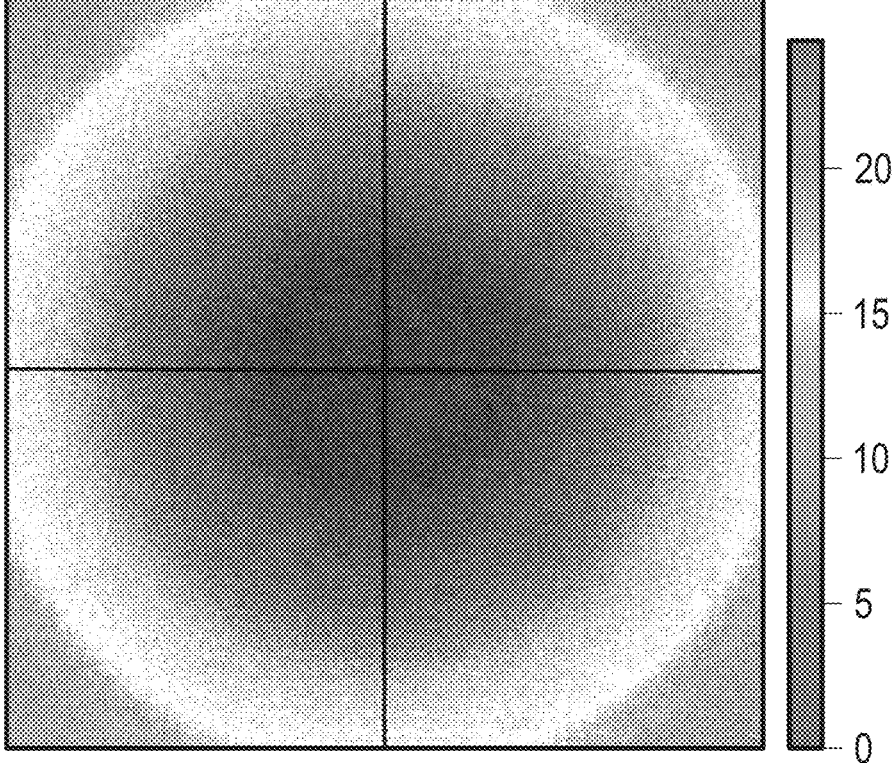

In one or more embodiments, hard piezoelectric rings fabricated with PZT-4 material (lead zirconium titanate) can be used, for example, which can be fabricated to be relatively thin and act as a diaphragm. Other types include, but are not limited to calcium titanate, barium titanate, lead titanate, strontium titanate, and the like. As shown in the total sound pressure contour plots depicted in FIGS. 2A and 2B, a piezoceramic ring embedded within a laminated glass structure in accordance with the present disclosure was compared to the same piezoelectric exciter by itself. The laminated glass structure including the embedded piezoelectric exciter was able to generate over 85 decibels (dB) sound at distance of 30 about centimeters (cm) within the glass laminate structure. The glass laminate structure included a PZT-4 based piezoelectric circular ring having a 19 mm diameter and a thickness of 0.3 mm was embedded within a polyvinyl butyral (PVB) laminate having a thickness of 0.6 mm for laminating 1×1 meter glass panels having thicknesses of 2.1 mm. The PZT-4 based piezoelectric circular ring was offset relative to a centerline longitudinally extending between the glass panels and contacted a selected one of the glass panel inner surfaces. The perimeter circular ring had a width of 5 mm, a radius of 9.5 mm, and a Young's modulus of 70 GPa. As shown, sound pressure exceeded 85 dB whereas the same piezoelectric exciter can only generate 30 dB sound at a distance of 30 cm. Other piezoelectric shaped rings such as those that are oval, polygonal, or any other geometric shape can also be used as well as other perimeter widths and thicknesses.

Figure 3:
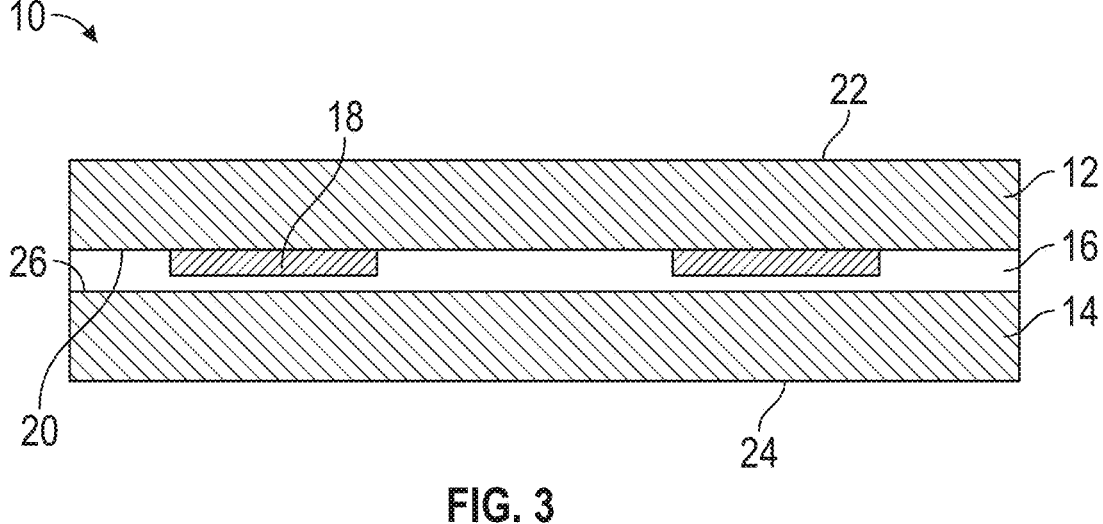
FIG. 3 is a cross sectional view of a laminated glass structure including a piezoelectric exciter embedded within a laminating material and on an inner surface of an exterior glass panel in accordance with one or more embodiments of the present disclosure.

Turning now to FIG. 3, there is depicted a cross sectional view of a laminated glass structure 10 in accordance with one or more embodiments of the present disclosure. The laminated glass structure 10 includes a first exterior glass panel 12, a second interior glass panel 14, a polymeric laminating material 16, also referred to as an interlayer, intermediate the first and second glass panels 12, 14, respectively, and one or more piezoelectric exciters 18, one of which is shown, provided on an inner surface 20 of the first exterior glass panel 12. The one or more piezoelectric exciters 18 are ring shaped and adhesively coupled at desired locations to the inner surface 20 (side 2) of the first exterior glass panel 12 and are encapsulated within the polymeric laminating material 16 when the first and second glass panels 12, 14 and the polymeric laminating material 16 in the form of a sheet are exposed to heat and pressure. The first exterior glass panel 12 also includes an outer surface 22 (side 1) facing the exterior environment when in use. The second interior glass panel 14 includes an outer surface 24 (side 4) facing the vehicle interior, i.e., cabin side, and an inner surface 26 (side 3). An electrical signal provided to the piezoelectric exciter 18 can be utilized to produce sound from the laminated glass structure and into the interior of the vehicle. By way of example, the laminated glass structure 10 can be utilized as a sliding roofing panel and include multiple piezoelectric exciters 18 spaced about the panel to provide sound from above occupants of the vehicle without affecting trim panel space.

Figure 4:
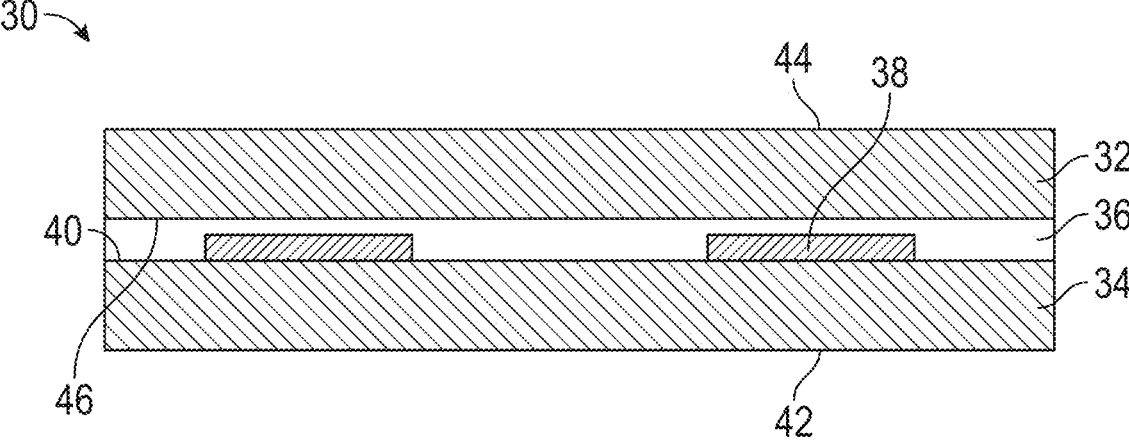
FIG. 4 is a cross sectional view of a laminated glass structure including a piezoelectric exciter embedded within a laminating material and on an inner surface of an interior glass panel in accordance with one or more embodiments of the present disclosure.

In FIG. 4, there is depicted a cross sectional view of a laminate glass structure 30 in accordance with one or more embodiments of the present disclosure. The laminated glass structure 30 includes a first exterior glass panel 32, a second interior glass panel 34, a polymeric laminating material (i.e., interlayer) 36 intermediate the first and second glass panels 32, 34, respectively, and one or more piezoelectric exciters 38, one of which is shown, provided on an inner surface 40 of the second interior glass panel 32. The one or more piezoelectric exciters 38 are ring-shaped and can be adhesively coupled at a desired location to the inner surface 40 (side 3) of the second interior glass panel 34 and is encapsulated within the laminating material 36 when the first and second glass panels 32, 34 and the polymeric laminate material sheet (interlayer) 36 are exposed to heat and pressure. The second interior glass panel 34 also includes an outer surface 42 (side 4) facing the interior of the vehicle when in use. The first exterior glass panel 32 includes an outer surface 44 (side 1) exposed to an environment about the vehicle interior (i.e., exterior side), and an inner surface 46 (side 2). An electrical signal provided to the piezoelectric exciter 38 can be utilized to produce sound from the laminate glass structure and into the interior of the vehicle.

Figure 5:
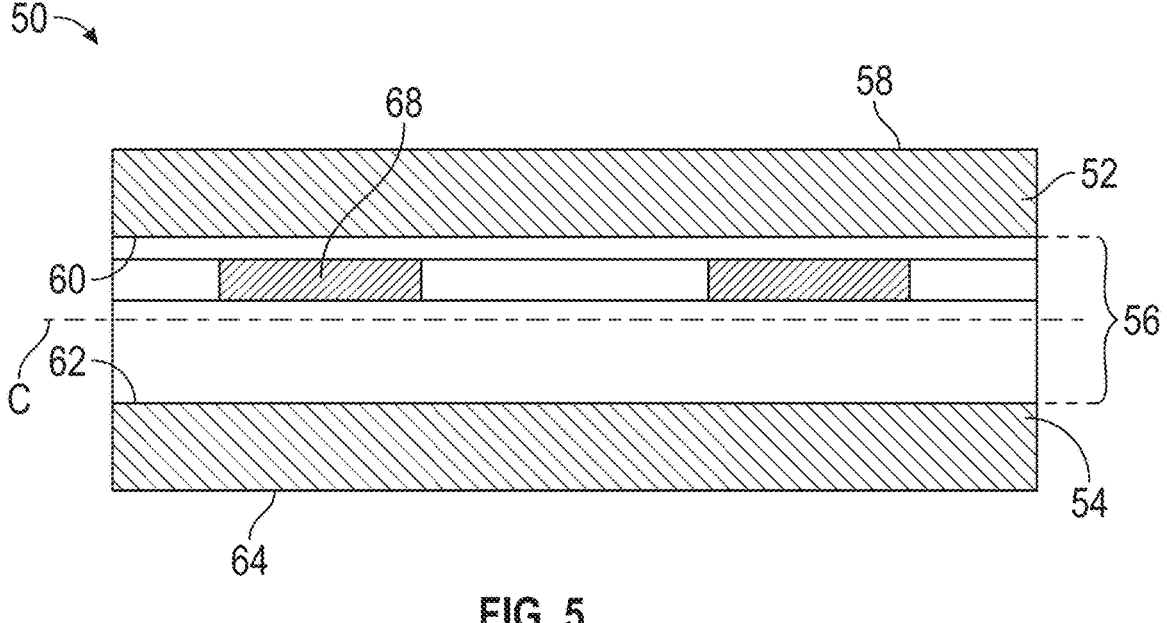
FIG. 5. is a cross sectional view of a laminated glass structure including a piezoelectric exciter embedded within a laminating material off-axis relative to a center line between opposing glass panels in accordance with one or more embodiments of the present disclosure.

In FIG. 5, the laminated glass structure 50 includes a first exterior glass panel 52, a second interior glass panel 54, and a polymeric laminating material (interlayer) 56 including multiple polymeric laminating material layers, which can be of the same material or different. The first exterior glass panel 52 includes an outer surface 58 facing the vehicle exterior and an inner surface 60 and the second interior glass panel 54 includes an outer surface 64 facing the vehicle interior, (i.e., ambient-side), and an inner surface 62. One or more piezoelectric exciters 68 are provided in the same plane as one of the polymeric laminating material layers within the stack and biased from a centerline (C) to provide sound when in use. As previously noted, placement of the piezoelectric exciters at the centerline line between opposing glass panels results in no sound since the soundwaves produced from the opposing glass panel layers are out of phase and cancel one another. By biasing the piezoelectric exciters relative to the centerline, sound can be produced. The piezoelectric exciters are ring shaped and can be secured to the laminated sheet without the need for special adhesives or preparations, bezels in the case of packaging grab handles being located on the roof, or other costly labor-intensive measures. There are manufacturing cost benefits by providing the piezoelectric exciters in the polymeric laminating material stack of layers. While the one or more piezoelectric exciter 68 are shown proximate to the inner surface of the first glass panel as opposed to the second panel, in one or more embodiments, the piezoelectric exciters 68 are positioned proximate to the inner surface of the second glass panel as opposed to the first panel.

Figure 6:
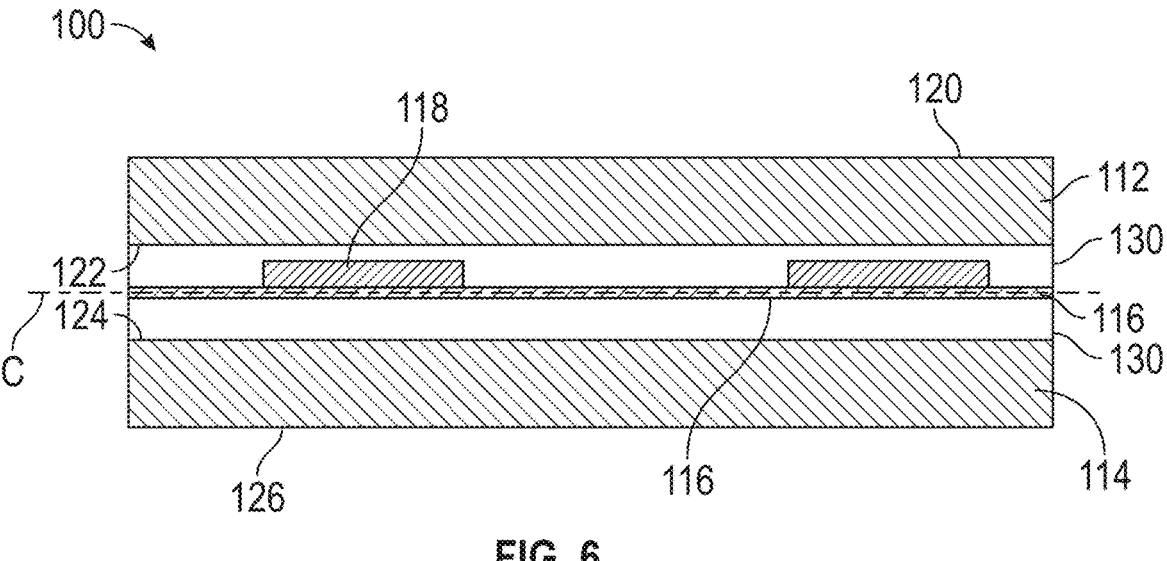
FIG. 6 is a cross sectional view of a laminated glass structure including a rigid plastic layer at the centerline between opposing glass panels and piezoelectric exciter on a selected surface of the plastic layer and partly embedded within a laminating material off-axis relative to the center line in accordance with one or more embodiments of the present disclosure.

In FIG. 6, there is depicted is a cross sectional view of a laminated glass structure 100 including a plastic layer 116 at the centerline (C) between opposing first exterior and second interior glass panels 112, 114, respectively, and a piezoelectric exciter 118 on a selected surface of the plastic layer 116 and partly embedded within a polymeric laminating material 130 at a location off-axis relative to the centerline (C) in accordance with one or more embodiments of the present disclosure. The polymeric laminating material 130 includes multiple layers, two of which are shown, wherein the piezoelectric exciter 118 is provided on a selected surface of the plastic layer and partly embedded within the polymeric laminating material 130 once assembled.

The first exterior glass panel 112 includes an outer surface 120 facing the exterior about the vehicle and an inner surface 122 and the second interior glass panel 114 includes an inner surface 124 and an outer surface 126 facing the vehicle interior (i.e., ambient side).

The plastic layer 116 can be semi-rigid or rigid and can be utilized for a variety of applications depending on the choice of material (e.g., solar reflectivity). Exemplary plastic layers 116 are polyesters such as polyethylene terephthalate (PET).

The piezoelectric exciter 118 can be adhesively coupled to a surface of the plastic layer 116 at a desired location or on a surface of a sheet of the polymeric laminating material 130 prior to application of heat and pressure to form the laminated glass structure 100. Although the piezoelectric exciter 118 is provided proximate to inner surface 122 (side 2) of the first glass panel 112, it should be apparent that the piezoelectric exciter can be provided on inner surface 124 (side 3) of the second glass panel 114, and still produce sound. Likewise, so long as the piezoelectric exciter 118 is offline relative to the centerline (C) longitudinally extending between the opposing glass panels 112, 114, sound can be produced. As such, in some embodiments, the plastic layer 116 could be offset relative to the centerline (C) within the polymeric laminating material 130, which would include different thicknesses of the polymeric laminating material therebetween. The plastic layer 116 can further include an electrically conductive metal coating that can be patterned such as by laser etching to provide power to the piezoelectric exciter and/or through the use of negative and positive wires electrically coupled to the piezoelectric exciter, which can be insulated or uninsulated so long as the wires are sufficiently spaced apart.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A laminated glass structure for a vehicle comprising:
a first glass panel;
a second glass panel;
a laminating material intermediate the first and second glass panels;
a plastic layer configured to provide solar reflectivity, wherein the plastic layer is different from the laminating material; and
one or more piezoelectric exciters which are embedded within the laminating material, offset relative to a centerline of the laminated glass structure, and in contact with a surface of the plastic layer,

wherein the centerline of the laminated glass structure longitudinally extends between the first and second glass panels and is defined by a centerline of the plastic layer.

2. The laminated glass structure of claim 1, wherein:
among the first glass panel and the second glass panel, the first glass panel is relatively closer to an exterior of the vehicle, and the second glass panel is relatively closer to an interior of the vehicle;
the one or more piezoelectric exciters are between the plastic layer and the first glass panel or are between the plastic layer and the second glass panel; and
the one or more piezoelectric exciters comprise a ring structure having a diameter of 19 mm, a thickness of 0.3 mm, and a Young's modulus of 70 Gpa.

3. The laminated glass structure of claim 1, wherein the plastic layer comprises polyethylene terephthalate.

4. The laminated glass structure of claim 1, wherein the laminating material comprises polyvinyl butyral resin or ethylene vinyl acetate.

5. The laminated glass structure of claim 1, wherein the laminating material has a thickness of about 0.3 millimeters to about 2 millimeters.

6. The laminated glass structure of claim 1, wherein the first glass panel includes an outer surface facing an exterior of the vehicle and is at a thickness within a range of about 1.6 millimeters to about 3.5 millimeters and wherein the second glass panel includes an outer surface facing an interior of the vehicle and is at a thickness within a range of about 0.7 millimeters to about 3.5 millimeters.

7. The laminated glass structure of claim 1, wherein the one or more piezoelectric exciters comprises a ring structure having a thickness dimension less than a thickness dimension for the laminating material.

8. The laminated glass structure of claim 1, wherein the one or more piezoelectric exciters comprises a lead zirconium titanate piezoelectric material.

9. The laminated glass structure of claim 1, wherein the one or more piezoelectric exciters are bonded directly to an interior surface of a selected one of the first and second glass panels.

10. The laminated glass structure of claim 2, wherein there are at least two adjacent piezoelectric exciters contacting a selected surface of the plastic layer.

11. The laminated glass structure of claim 10, wherein the at least two adjacent piezoelectric exciters contact the same selected surface.

12. The laminated glass structure of claim 10, wherein the one or more piezoelectric exciters comprises a ring structure comprising a circular-shape, an oval-shape, or a polygonal shape.

13. A process of forming a laminated glass structure for a vehicle comprising:
adhesively applying one or more hard piezoelectric exciters to a selected glass surface of a first glass panel, to a selected glass surface of a second glass panel, or a combination thereof;
assembling the first glass panel, the second glass panel, a plastic layer configured to provide solar reflectivity, and at least one sheet of laminating material to form an assembly, wherein the selected glass surface of the first glass panel, the selected glass surface of a second glass panel, or the combination thereof to which the one or more hard piezoelectric exciters are adhesively applied are oriented to contact the laminating material, and the plastic layer is different from the at least one sheet of laminating material; and applying heat and pressure to the assembly in amounts effective to laminate the first glass panel to the second glass panel and form the laminated glass structure, wherein:

the one or more hard piezoelectric exciters are intermediate the first and second glass panels and are offset relative to a centerline of the laminated glass structure, and the centerline of the laminated glass structure longitudinally extends between the first glass panel and the second glass panel and is defined by a centerline of the plastic layer.

14. The process of claim 13, wherein the laminating material comprises polyvinyl butyral resin or ethylene vinyl acetate.

15. The process of claim 13, wherein the one or more hard piezoelectric exciters comprise a ring structure.

16. The process of claim 13, wherein the one or more hard piezoelectric exciters comprise lead zirconium titanate.

17. The process of claim 13, wherein:

the at least one sheet of laminating material comprises at least two sheets of the laminating material;

the plastic layer is intermediate the at least two sheets of the laminating material; and the one or more hard piezoelectric exciters are embedded in a sheet of the at least two sheets, wherein the sheet is between the first glass panel and the plastic layer or is between the second glass panel and the plastic layer.

18. The process of claim 17, wherein the plastic layer comprises polyethylene terephthalate.

19. The process of claim 13, wherein the one or more piezoelectric exciters comprises a ring structure having a thickness dimension less than a thickness dimension for the at least one sheet of laminating material.

20. A laminated glass structure for a vehicle, the laminated glass structure comprising:

an outer glass panel having a thickness of about 1.6 to about 3.5 millimeters, the outer glass panel including an outer surface exposed to an environment about the vehicle and an inner surface;

an inner glass panel having a thickness of about 0.7 millimeters to about 3.5 millimeters, the inner glass panel including an inner surface and an outer surface exposed an interior of the vehicle;

a laminating material having a thickness of about 0.3 millimeters to about 2 millimeters between the outer glass panel and the inner glass panel and in contact with the inner surfaces of the outer and inner glass panels, wherein the laminating material comprises polyvinyl butyral resin or ethylene vinyl acetate;

a plastic layer configured to provide solar reflectivity, wherein the plastic layer is in contact with and different from the laminating material; and one or more hard piezoelectric exciters which are embedded at least partly in the laminating material, are in a shape of a ring having a thickness less than an actual thickness of the laminating material, and are offset relative to a centerline of the laminated glass structure, wherein:

the centerline of the laminated glass structure longitudinally extends between the inner surfaces of the outer and inner glass panels and is defined by a centerline of the plastic layer, and the one or more hard piezoelectric exciters are in contact with a selected one of the inner surfaces, are completely embedded in the laminating material, or are in contact with a surface of the plastic layer, wherein the laminated glass structure forms a fixed or sliding roofing system, one or more passenger movable windows, a front windshield and/or a rear windshield.

\* \* \* \* \*